United States Patent Office 3,479,318
Patented Nov. 18, 1969

3,479,318
MOULDABLE POLYESTER COMPOSITIONS CONTAINING FINELY DIVIDED PYROPHYLLITE
John Brian Jackson, Francis Raymond Sherliker, and Hamish Arthur Long, Runcorn, England, assignors to Imperial Chemical Industries Limited, London, England, a corporation of Great Britain
No Drawing. Filed Nov. 24, 1967, Ser. No. 685,257
Claims priority, application Great Britain, Dec. 9, 1966, 55,305/66
Int. Cl. C08g 51/06
U.S. Cl. 260—40                6 Claims

ABSTRACT OF THE DISCLOSURE

A composition comprising poly(ethylene terephthalate) containing a small amount of finely divided pyrophyllite, preferably from 0.2 to 1% by weight of the polymer, and a method of forming shaped articles therefrom.

---

The present invention relates to poly(ethylene terephthalate) compositions having improved moulding properties.

Hitherto, while poly(ethylene terephthalate) has been used widely as a film and fibre forming material, it has failed to achieve significance as a general purpose moulding plastic. This is mainly due to the brittleness of the commonly used unoriented crystalline fibre of film grade polymer. However, the advent of higher molecular weight (intrinsic viscosity ~1.0) polymer has led to the introduction of moulding grades of poly(ethylene terephthalate). The maximum rate of crystallisation occurs near to 140° C. and the absolute rate of crystallisation decreases with increasing molecular weight. However, moulding conditions may be adjusted so as to induce crystallisation of the polymer in the shaped articles but to obtain adequate and uniform crystallisation it has generally been found necessary to use uneconomically long dwell times at high mould temperatures near to 140° C. and/or to introduce extended post-shaping heat treatments. If these optimising conditions are not used, the crystallinity of the polymer in the shaped articles tends to be non-uniform and coarse and the products consequently suffer from undue brittleness, reflected by low impact strengths.

We have now found that the dwell times in the mould may be reduced if the poly(ethylene terephthalate) is used in admixture with a small amount of finely divided pyrophyllite. The use of this additive appears to promote speedier crystallisation of the polymer or, alternatively, to result in the production of shaped articles having improved homogeneity and fineness of crystalline structure (and therefore reduced brittleness) compared with those obtained under similar conditions in its absence.

The effect of this additive has been found to be more marked with poly(ethylene terephthalates) prepared by polymerisation processes involving the use of polymer-soluble catalysts, for example such as amorphous germanium dioxide, than with the same polymers prepared by polymerisation processes involving the use of polymer-insoluble catalysts, for example antimony trioxide. This may be because in the latter case the finely divided insoluble catalyst residues which are well dispersed throughout the polymer already provide some slight promotion of the rate of crystallisation of the polymer.

Pyrophyllite, which is a hydrous aluminium silicate having in the chemically pure state the formula $AL_2(Si_4O_{10})(OH)_2$, occurs naturally in varying degrees of purity but we have found that the better effects are obtained with the purer material. For example, so-called "white" Indian pyrophyllite is better than purple Indian pyrophyllite which contains larger amounts of metal oxides, particularly iron oxide, as impurities. The particle size of the pyrophyllite also has a bearing on its effectiveness and is desirably less than 50 microns in any dimension. Preferably it is less than 5 microns.

Only small amounts of pyrophyllite are required for success, and in general amounts in excess of from 1–5% based on the weight of polymer, although usable, may lead to undesirable plating out; that is, the diffusion of pyrophyllite to the surface of the shaped article thereby detracting from its surface properties. The preferred amount lies in the region of from 0.05 to 1.0%, and more preferably from 0.20 to 1.0%, by weight of the polymer.

The pyrophyllite may be combined with the polymer in any suitable manner but it is desirable to ensure that good dispersion is obtained. Examples of methods of incorporation include incorporation with one or more of the ingredients for the polymerisation, addition during the polymerisation reaction or addition to the polymer at some later stage but before moulding. The pyrophyllite may be tumble-blended or otherwise mixed with the polymer in the dry state if desired but in this case it is preferred that the dry mix is submitted to further treatment with the polymer in the molten state to ensure more complete dispersion. This further treatment may be effected suitably, for example in a screw extruder and conveniently the extruder may be used in conjunction with injection-moulding apparatus for driving the polymer into the mould. Where the injection-moulding apparatus is ram fed, it is preferred to screw extrude the dry mixed composition in a preliminary operation so as to obtain good dispersion.

The compositions comprising poly(ethylene terephthalate) and pyrophyllite may be shaped in any desired manner; for example, they may be converted to filaments, fibres and films by extrusion. However, they are particularly suitable for conversion to thickwalled articles, e.g. by compression-moulding or injection-moulding.

Thus, another embodiment of our invention comprises heating a composition comprising poly(ethylene terephthalate) containing a small amount of finely divided pyrophyllite above the melting point of the polymer, causing it or allowing it to conform to the shape of a confining wall, e.g. of a mould, cooling it in contact with said confining wall until it is able to retain the contours therof when it is removed therefrom, and causing or allowing the polymer to crystallise.

Crystallisation may be encouraged by several methods. For example, it has been found profitable to keep the polymer as little above its melting point as possible while it is in the molten state. It is also advantageous to use a mould heated above 110° C. e.g. 110–180° C. and preferably to 135–150° C. It may also be found desirable to heat-treat the shaped article after the shaping step although this is not usually required if the polymer is allowed to remain long enough in a hot mould.

Very suitable apparatus for shaping the compositions are screwfed injection moulding machines. Compositions wherein the ingredients have been mixed by tumble-blending or other suitable dry mixing techniques may be used as the feedstoock to such apparatus, further mixing being provided for in the screw part of the extruder.

To avoid thermally degrading the polymer, it is desirable to avoid the use of very high temperatures when the polymer is in the molten state. For example, the use of temperatures much above 290° C. for more than a few seconds may lead to undesirably severe degradation of the polymer and in general we prefer to avoid the use of temperatures above 270° C. for extended periods of time.

The mould surface is suitably formed from a high melting metal, e.g. steel, copper, brass, cast-iron or chromium-plated steel, the latter being particularly preferred because of its hardness and the permanent nature of its good surface finish.

Before moulding, it is highly desirable to ensure that the moisture content of the composition is as low as possible, and preferably below 0.05% by weight. This reduces the danger of degradation during the moulding process. Adequate drying may be achieved, for example by heating the composition for several hours, preferably at least for some of the time in a high vacuum, possibly while sweeping the atmosphere above it with a flow of dry inert gas, e.g. nitrogen. Adequate precautions should then be taken between drying and moulding to avoid moisture up-take.

The polymer is most easily handled in the form of chips, flakes or granules for feeding to the moulding machine.

Ancillary ingredients may be incorporated into the compositions before moulding, if desired. Examples are fillers e.g. china clay, pigments, dyes, heat and light stabilizers, mould lubricants and mould release agents. The compositions may also be blended with other polymers, natural or synthetic, if desired. It has been found particularly advantageous to incorporate fibrous fillers, especially chopped glass fibres for which concentrations of up to 55 to 60% by weight of the total composition have been found suitable.

Further advantages in physical properties in the shaped articles obtained from the compositions of our invention may be obtained if the apparent X-ray crystallinity of the polymer is reduced to a value between 20% and 45%, and preferably 20% and 40%. The apparent X-ray crystallinity of the sample is expressed as a percentage and is defined by the formula:

$$\frac{100C}{A+C}$$

where A and C are the areas corresponding to diffraction from the amorphous and crystalline areas respectively of a polymer sample which has been annealed at 200° C. for 1 hour, the areas being measured directly from diffractometer scans.

One means of obtaining such modification of the apparent X-ray crystallinity comprises incorporating in the poly(ethylene terephthalate) polymer chain a small number of units derived from one or more comoners and it is to be understood that throughout the specification and claims the term poly(ethylene terephthalate) also includes crystallisable copolymers thereof containing small amounts of comonomer units in the polymer chains.

The comonomers may be, for example, diols other than ethylene glycol, diacids other than terephalic acid, hydroxycarboxylic acids, diamines, aminoacids, aminoalcohols, lactones and/or lactams. Particular examples include diethylene glycol, cyclohexane-1,4-dimethylol, adipic acid, sebacic acid and isophthalic acid. Other examples are:

DIOLS (a) Polymethylene glycols of the type $HO(CR_2)_nOH$ where $n=2-20$ and R is hydrogen or a group that does not interfere with the polycondensation reaction and is preferably selected from: alkyl, aryl, cycloalkyl, aralkyl and alkaryl. When $n=2$, only two such groups may be present, the remainder of groups represented by R being hydrogen, but for higher values of $n$, up to 4 such groups may be included, preferably sited on carbon atoms of the chain separated from the OH group by at least one $CH_2$ group. Examples of suitable diols include: propane-1:2-diol, propane-1:3-diol, tetramethylene glycol, penta- and hexamethylene glycols, decane-1:10-diol, tetradecane-1:14-diol, 2:2-dimethylpropane-1:3-diol, butane-1:3 diol, hexane-1:5 or 2:5-diol, methyl- or ethyldecane diols, 2-phenylpropane-1:3-diol, cyclohexylethylene glycol and 2-benzylpropane-1:3-diol.

(b) Acyclic glycols of the types $$HO(CR_2)_pX(CR_2)_qOH$$

where R has the meaning above-defined, X is —O—, —S—, —SO— or —SO$_2$—, and p and q are integers of value 2 or greater. In addition, polymethylene glycols having more than one X group interpolated into the polymethylene chain may also be used. Examples are diethylene glycol, triethylene glycol, thiodipropanol, sulphodipentanol and bis-(3-hydroxypropyl sulpho) alkanes.

(c) Ring-containing diols of the type $$HO.CH_2.Y.G.Z.CH_2.OH$$

in which G is a cyclic unit of the benzenoid or polybenzenoid classes, or an alicyclic ring which may itself contain a bridge of atoms, and Y and Z are each selected from direct linkages and linking units such as $(CH_2)_n$, —O—, or combinations of these. Examples of suitable diols include cyclopentane dimethanols, cyclohexane dimethanols, norbornane dimethanols, xylylene glycols, p-di-(2-hydroxyethoxy)benzene, m-phenylene dipropanol, bicyclohexyl dimethanols, bicyclo(2.2.2)octane dimethanol, decahydronaphthalene, di(2-hydroxyethoxyphenyl) propane, di(2-hydroxyethoxyphenyl)methane and di(2-hydroxyethoxyphenyl) sulphone dimethanols. If desired, one or both of the $CH_2$ groups connecting the OH groups to the units Y and Z may also be omitted, although it is preferred in these cases that the OH group of the diol, when directly connected to an alicyclic ring, should not readily be prone to thermal dehydration. Thus, whilst cyclohexane diols may not be suitable co-reactants for this invention, the substituted 2,2,4,4-tetraalkylcyclobutane-1,3-diols are very suitable. Owing to their relatively low reactivity in polyesterification reactions, dihydric phenols are not generally suitable co-reactants for this invention.

HYDROXYCARBOXYLIC ACIDS

Hydroxycarboxylic acids or units related to them, derived from the use of lactones, are suitable co-reactants provided that they do not contain structural groups which would be unstable in the conditions of polyesterification or which would interfere with the course of the polymerisation reaction. Examples of suitable hydroxycarboxylic acids (or cyclic lactones thereof) include m- and p-carboxybenzyl alcohols, m, and p-2-hydroxyethoxybenzoic acids, p-3-hydroxypropylbenzoic acid, δ-valerolactone, ϵ-caprolactone, φ-enantholactone, tetradecanolide, pentadecanolide, p-2-dioxanone, and substituted derivatives thereof containing not more than 2 alkyl groups preferably not adjacent to the OH groups in the case of hydroxycarboxylic acids or to the —O— atom of the —CO.O— group in the case of lactones. In general, hydroxycarboxylic acids having their OH groups as phenolic hydroxyl groups are insufficiently reactive in polyesterification to be of value as co-reactants for the production of the copolyesters of this invention.

DICARBOXYLIC ACIDS (1) Dicarboxylic acids of the type $$HOOC(CR_2)_nCOOH$$

where $n=1-20$, and R is hydrogen or an alkyl, aryl, cycloalkyl, aralkyl or alkaryl group, such that up to 2 such groups may be present when $n=2$, and up to 4 such groups may be present for higher values of $n$. Examples are malonic acid, alkyl malonic acids, glutaric acid, adipic acid, 3-methyl-adipic acid, phenyl adipic acid, suberic acid, azelaic acid, sebacic acid, isosebacic acid, methylsuccinic acid, dodecane-1:2-dioic acid.

(2) Aromatic dicarboxylic acids such as phthalic acid, isophthalic acid, homophthalic acids, naphthalene dicarboxylic acids, biphenyl dicarboxylic acids, diphenyl ether and diphenyl sulphone dicarboxylic acids, diphenyl methane dicarboxylic acid, diphenoxyalkane dicarboxylic acids, diphenylalkane dicarboxylic acids, diphenylthioalkane dicarboxylic acids. There may also be used substituted derivatives of terephthalic acid and of any of the above-mentioned dicarboxylic acids having in the aromatic rings 1 to 3 substituent groups selected so as not to interfere with the polyesterification process: suitable groups are halogen-, alkyl-, alkoxy-, alkylthio- and alkylsulphonyl groups. There may thus be used mono- and dimethylterephthalic acids, alkoxyisophthalic acids, mono- and dichloroiso- and terephthalic acids, methoxy naphthalene dicarboxylic acids, n-propoxyphthalic acids and isopropyl- or t-butylphthalic acids.

(3) Alicyclic acids such as cyclopentane-, cyclohexane and higher cycloalkane dicarboxylic acids including bridged-ring derivatives such as norbornane dicarboxylic acids, bicyclooctane-dicarboxylic acids, adamantane dicarboxylic acids, and dicarboxylic acids derived from the carbonylation of dicyclopentadiene. In such acids, the carboxyl groups may also be separated from the nuclear structure by one or more methylene groups or chains of methylene groups interspersed with —O— or —SO$_2$— groups.

(4) Aliphatic dicarboxylic acids containing —O—, —N(R)—, —S—, —SO—, and —SO$_2$— groups in the chains. Examples are: diglycollic acid, thiodivaleric acid, sulphonyl dipropionic acid, N-methyliminodiacetic acid.

Small amounts of diethylene glycol residues may be incorporated in the polymer chains by adventitious homocondensation of the ethylene glycol during the formation of poly(ethylene terephthalate).

The amount of comonomer or comonomers required to achieve the desired reduction in crystallinity will generally depend upon their individual nature but may be established by simple experiment. The nature and amount of the comonomer or comonomers used are preferably also chosen such that the melting point of the polymer is not reduced below 180° C. and preferably 200° C. and such that the glass/rubber transition point of the polymer is not reduced below 40° C., and preferably not below 70° C. In general, it is preferred that the polymer chains contain at least 95% molar of ethylene terephthalate residues.

Another preferred feature of the poly(ethylene terephthalate) is that it has an intrinsic viscosity of at least 0.7 in the shaped article. Particularly advantageous physical properties are thereby obtained. The intrinsic viscosities referred to are those measured on solutions of 1 gm. of polymer in 100 mls. of o-chlorophenol at 25° C.

The invention is illustrated by the following examples.

EXAMPLE 1

Preparation of pyrophyllite

Lumps of white Indian pyrophyllite were crushed in a jaw crusher to yield smaller lumps having average dimensions of about ⅜ inch. Two 500 gm. samples of this crushed mineral were sieved through a 5 mesh sieve and then ground separately for 5 minutes each in a rod mill which comprised a 8⅛ inch diameter cylindrical casing 9⅞ inch long carrying twelve 9¾ inch long rods, six of which were 1 inch diameter and six of which were 2¾ inch diameter. The total rod weight was 9.683 kg. and the mill was rotated at 94 r.p.m.

The two milled 500 gm. samples were thoroughly mixed together, the mixture divided into two, and each half milled again for a further 15 minutes. The product was then dried over a gas flame and fed to an infra-sizer made by Haultain of Canada in order to break up aggregate and effect grading.

The infra-sizer comprises six inverted truncated cones placed side by side, each having a different length and minimum internal diameter, the lengths reducing from four to three feet along the series and the minimum diameters increasing progressively from 2½ inches to 14 inches. The cones are connected in series by tubing and the discharge from the last cone goes to a dust collecting bag. An air stream is passed through the cones at a pressure of 9 inches of mercury.

The pyrophyllite deposited in the first cone, i.e. the coarsest grade from the infra-sizer, was collected and used. Its average particle size was 30 microns and it was mostly below 50 microns.

Mixing and moulding of polymer 2 kg. of chip poly(ethylene terephthalate) having an intrinsic viscosity of about 0.9, measured on a solution of 1 gm. of polymer in 100 ml. of o-chlorophenol at 25° C., and which had been prepared by a polymerization process using a polymer-insoluble catalyst, was dried in an oven at 150° C. for 4 hours under an absolute pressure of 0.01 mm. of mercury. The dry chip was then tumbled at room temperature with 10 gm. of the finely divided pyrophyllite.

The mixture was fed into the hopper of a 2 ounce Stubbe injection-moulding machine and formed into tensile specimens and other shaped pieces. The barrel heaters of the extruder of the moulding machine were set at 280° C. each and the nozzle heater was set to No. III. The mould temperature was 140° C., injection pressure was 140 kg./sq. cm., clamping pressure was 15 kg./sq. cm. and injection and cooling times of 15 seconds each were used.

The shaped articles so produced conformed closely to the shapes of the moulds. Tensile and flexural properties measured on a Hounsfield Type E Tensometer at 23° C. using standard dumbell shaped specimens were as follows:

Tensile modulus (strain rate 100%/minute) 28,000 kg./ sq. cm. (average of several measurements).

Yield stress (strain rate 100%/minute) 720 kg./sq. cm. (average of several measurements).

An average flexural modulus of 28,000 kg./sq. cm. was recorded from a three-point loading test at a strain rate of 10%/minute.

Unnotched samples did not fail on a Charpy impact machine. Samples having a 0.010 inch radius 45° notch 0.110 inch deep were found to have an impact strength of 2-75-2.8 kg. cm./cm.$^2$, as measured on a Charpy-type Hounsfield Impact Tester.

Microscopic examination using a polarising microscope showed a very fine crystal structure in the crystalline regions, and the polymer in the moulded samples has an intrinsic viscosity in the range 0.8–0.85. The samples have an apparent X-ray crystallinity of 35%.

Pyrophyllite grades from the other cones of the infra-sizer may also be used with poly(ethylene terephthalate) to give similar effects. The white grade could also be replaced by purple Indian pyrophyllite but this was less efficient.

The replacement of the poly(ethylene terephthalate) with a copolymer containing from 3 to 5 mole percent of diethylene glycol residues (calculated in the total amount of glycol residue) yields mouldings of reduced crystallinity and improved physical properties.

By way of comparison, several other finely divided insoluble solids were tried in place of pyrophyllite. These included: slate powder, zinc oxide, finely ground mica, graphite, china clay and finely divided calcium carbonate. Several were wholly ineffectual and the others were considerably less effective than pyrophyllite.

EXAMPLE 2

2 kg. of chip poly(ethylene terephthalate) having an intrinsic viscosity of about 0.9, measured on a solution of 1 gm. of polymer in 100 ml. of o-chlorophenol at 25° C., and which had been prepared by a polymerisation process using a polymer soluble catalyst, was dried in an oven at 150° C. for 4 hours under an absolute pressure of 0.01 mm. of mercury. The dry chip was then tumbled at room temperature with 20 gm. of the finely divided pyrophyllite, prepared as described in Example 1.

The mixture was fed into the hopper of a 2 ounce Stubbe injection-moulding machine and formed into impact specimens and other shaped pieces. The barrel heaters of the extruder of the moulding machine were each each set in the range 250–265° C. and the nozzle heater was set to No. III. The mold temperature was 140° C., injection pressure was 140 kg./sq. cm., clamping pressure was 15 kg./sq. cm. and injection and cooling times of 45 seconds each were used.

The shaped articles so produced conformed closely to the shapes of the moulds.

Unnotched samples did not fail on a Charpy impact machine. Samples having a 0.010 inch radius 45° notch 0.110 inch deep were found to have an impact strength of 2.7–2.9 kg. cm./cm.$^2$, as measured on a Charpy-type Hounsfield Impact Tester.

An average flexural modulus of 28,000 kg./sq. cm. was recorded from a three-point loading test at a strain rate of 10 percent/minute.

Moulded samples had an intrinsic viscosity in the range 0.08–0.85 and an apparent X-ray crystallinity of 35%.

By way of comparison, moulding samples of the same poly(ethylene terephthalate) under identical conditions but in the absence of pyrophyllite yielded substantially amorphous mouldings. On increasing the cooling time to a minute or more, however, crystalline mouldings were produced but these had a much coarser crystalline texture and showed markedly poorer impact strengths. For example, those having a 0.010 inch radius 45° notch 0.110 inch deep had impact strengths of from 2.2 to 2.3 kg. cm./cm.$^2$, as measured on a Charpy-type Hounsfield Impact Tester.

EXAMPLE 3

When the procedure was repeated with 4 gm. of pyrophyllite, moulded samples having notched impact strengths in the range 2.6–2.7 kg. cm./cm.$^2$ were obtained. For comparison the procedure was repeated with 20 gm. of finely divided calcium carbonate (Califort U) and mouldings having impact strengths in the range 2.4–2.5 kg. cm./cm.$^2$ were obtained.

What we claim is:

1. A composition consisting essentially of poly(ethylene terephthalate) and finely divided pyrophyllite, said pyrophyllite being in the form of particles having a maximum dimension of less than 50 microns and being present in an amount up to 5% by weight of the poly(ethylene terephthalate).

2. A composition according to claim 1 in which the pyrophyllite is present in an amount of from 0.20 to 1% by weight of the polymer.

3. A composition according to claim 1 which also contains chopped glass fibres.

4. A composition according to claim 1 wherein the polymer is such that in an article shaped from the composition the apparent X-ray crystallinity is from 20 to 45%.

5. A composition according to claim 1 wherein the polymer is chosen such that in an article shaped from the composition it has an intrinsic viscosity measured on a solution of 1 gm. thereof in 100 mls. of o-chlorophenol at 25° C., of at least 0.7.

6. A shaped article of a composition as claimed in claim 1.

References Cited

UNITED STATES PATENTS 3,290,164  12/1966  Ferrigro _____ 260—40

OTHER REFERENCES

Carswell Phenoplasts, pp. 238–241, Interscience Publishers copy group 140 tp. 986, p4c3 (1947).

Grant Hackh's Chemical Dictionary p. 701 McGraw-Hill Book Company, New York copy group 140 (1934).

ALLAN LIEBERMAN, Primary Examiner

R. BARON, Assistant Examiner

U.S. Cl. X.R.

106—288

PO-1050
(5/69)

UNITED STATES PATENT OFFICE
CERTIFICATE OF CORRECTION

Patent No. 3,479,318    Dated November 18, 1969

Inventor(s) John Brian Jackson, Francis Raymond Sherliker, and Hamish Arthur Long It is certified that error appears in the above-identified patent and that said Letters Patent are hereby corrected as shown below:

Column 1, line 28, change the period to a comma and cancel beginning with the sentence: "This is mainly. . ." to and including "it has generally" Column 1, line 38, and insert the following:

--mainly due to brittleness associated with non-uniform and coarse crystallinity in the unoriented polymer. The maximum rate of crystallisation of the polymer occurs near 140°C and the absolute rate of crystallisation decreases with increasing molecular weight. Moulding conditions may thus be adjusted so as to induce crystallisation of the polymer in the shaped articles. To obtain adequate and uniform crystallisation, however, it has generally--.

SIGNED AND SEALED
JUN 30 1970

(SEAL)
Attest:

Edward M. Fletcher, Jr.
Attesting Officer

WILLIAM E. SCHUYLER, JR.
Commissioner of Patents